US012568054B2

(12) United States Patent
Delshadpour et al.

(10) Patent No.: US 12,568,054 B2
(45) Date of Patent: Mar. 3, 2026

(54) COMMUNICATIONS CIRCUIT

(71) Applicant: NXP USA, Inc., Austin, TX (US)

(72) Inventors: Siamak Delshadpour, Phoenix, AZ (US); Xu Zhang, Chandler, AZ (US); Xiaoqun Liu, Chandler, AZ (US); Xueyang Geng, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 347 days.

(21) Appl. No.: 18/053,172

(22) Filed: Nov. 7, 2022

(65) Prior Publication Data

US 2024/0154919 A1 May 9, 2024

(51) Int. Cl.
*H04L 49/90* (2022.01)
(52) U.S. Cl.
CPC .................................... *H04L 49/90* (2013.01)
(58) Field of Classification Search
CPC ......... H04L 49/90; H04L 25/02; H04L 25/08; H04L 25/03; H04L 25/06; H04L 12/28; H04L 12/50; H03K 5/00; H03K 5/13; H03K 19/01; H03F 3/45; H03F 3/30; H03F 3/19; H03F 3/21; H03F 1/30; H03F 1/56; H03F 1/52
USPC ......................................................... 370/412
See application file for complete search history.

(56) References Cited

U.S. PATENT DOCUMENTS

| | | | | |
|---|---|---|---|---|
| 7,400,196 | B2 | 7/2008 | Wyatt | |
| 9,306,509 | B2 * | 4/2016 | Lim .......................... | H03F 3/72 |
| 9,432,230 | B1 * | 8/2016 | Chang ...................... | H04B 3/14 |
| 9,602,314 | B1 * | 3/2017 | Chang ................. | H04L 25/0292 |
| 9,966,908 | B1 * | 5/2018 | Carey ................. | H03F 3/45475 |
| 10,447,507 | B1 | 10/2019 | Zhang et al. | |
| 10,498,564 | B2 * | 12/2019 | Jalali Far ................ | H04L 25/12 |
| 10,917,055 | B2 | 2/2021 | Geng et al. | |
| 10,998,720 | B2 * | 5/2021 | Yuan ......................... | H03F 1/52 |
| 11,005,688 | B2 * | 5/2021 | Ahmadi .............. | H03F 3/45197 |
| 11,245,555 | B1 | 2/2022 | Delshadpour | |
| 11,349,463 | B2 | 5/2022 | Delshadpour et al. | |
| 11,374,603 | B2 * | 6/2022 | Liu ...................... | H03F 3/45991 |
| 11,552,830 | B2 * | 1/2023 | ElShater ........... | H04L 25/03878 |
| 11,575,403 | B2 * | 2/2023 | Liu ...................... | H03F 3/45475 |
| 12,028,071 | B2 * | 7/2024 | Delshadpour .. | H03K 19/017518 |
| 12,081,212 | B2 * | 9/2024 | Zhang .................... | H03H 11/02 |
| 2020/0153395 | A1 | 5/2020 | Geng et al. | |

(Continued)

OTHER PUBLICATIONS

Gondi, S. et al.; "Equalization and Clock and Data Recovery Techniques for 10-GB/s CMOS Serial-Link Receivers", IEEE Journal of Solid-State Circuits, vol. 42, No. 9, Sep. 2007; pp. 1999-2011.

(Continued)

*Primary Examiner* — Man U Phan

(57) ABSTRACT

One example discloses a communications circuit, including: a buffer having a buffer input and a buffer output; wherein the buffer includes a first path and a second path; wherein the first path includes, a first resistor coupled to the buffer input; a second resistor coupled to the buffer output; a current source having a first end and a second end; wherein the first resistor and the second resistor are coupled to a mid-point; wherein the first end of the current source is coupled to the mid-point; and wherein the second path includes a capacitor having a first end coupled to the buffer input and a second end coupled to the buffer output.

17 Claims, 5 Drawing Sheets

100

(56) References Cited

U.S. PATENT DOCUMENTS

2020/0274545 A1*  8/2020  Schifmann .......... H03M 1/1215
2022/0140821 A1   5/2022  Delshadpour et al.

OTHER PUBLICATIONS

Anantharaman, S. et al.; "6.2.2 Channel Overview"; Universal Serial Bus 3.2 Specification, Revision 1.1, Jun. 2022, Available: http://www.usb.org, 1 page.

* cited by examiner

COMMUNICATIONS CIRCUIT

The present specification relates to systems, methods, apparatuses, devices, articles of manufacture and instructions for signal communications.

SUMMARY

According to an example embodiment, a communications circuit, comprising: a buffer having a buffer input and a buffer output; wherein the buffer includes a first path and a second path; wherein the first path includes, a first resistor coupled to the buffer input; a second resistor coupled to the buffer output; a current source having a first end and a second end; wherein the first resistor and the second resistor are coupled to a mid-point; wherein the first end of the current source is coupled to the mid-point; and wherein the second path includes a capacitor having a first end coupled to the buffer input and a second end coupled to the buffer output.

In another example embodiment, the second end of the current source is coupled to a reference potential.

In another example embodiment, the reference potential is a ground potential

In another example embodiment, the second end of the current source is coupled to a power source.

In another example embodiment, the buffer is configured as at least one of an isolator, a level-shifter, and/or an amplifier between the buffer input and the buffer output.

In another example embodiment, the buffer includes a diode coupled between the first resistor and the mid-point.

In another example embodiment, the communications circuit is a linear redriver circuit.

In another example embodiment, the buffer includes a feedback circuit coupled to modulate the current source's current based on a voltage at the buffer output.

In another example embodiment, the buffer includes a controller coupled to the current source; and the controller is configured to adjust the current source's current based on a voltage from the buffer output.

In another example embodiment, further comprising a CTLE (continuous time linear equalizer) coupled to the buffer output.

In another example embodiment, further comprising a transmit (TX) driver coupled to the buffer output.

In another example embodiment, the buffer input is a differential input having a first input line and a second input line; and the first path and the second path together for a first path set coupled to the first input line; further comprising a second path set coupled to the second input line; wherein the second path set is a duplicate of the first path set.

In another example embodiment, the buffer output is a differential output having a first output line and a second output line; the first path set is coupled to the first output line; and the second path set is coupled to the second output line.

In another example embodiment, the buffer includes a differential amplifier coupled to receive a voltage reference and a common mode voltage divided from the first and second output lines.

In another example embodiment, the differential amplifier is coupled to control the current sources in the first path set and the second path set.

In another example embodiment, the buffer is a first buffer, the buffer input is a first buffer input, and the buffer output is a first buffer output; the communications circuit further comprises, a second buffer, that is a duplicate of the first buffer and is coupled to a second buffer input and a second buffer output; a CTLE (continuous time linear equalizer) coupled between the first buffer output and the second buffer input; and a transmit (TX) driver coupled to the second buffer output.

In another example embodiment, further comprising an input termination circuit coupled to the first buffer input; and an output termination circuit coupled to an output of the TX driver.

In another example embodiment, the communications circuit is configured to be wirelessly coupled to a second communications circuit.

In another example embodiment, further comprising an ESD (electrostatic discharge) device having one end coupled to both the first path and the second path, and a second end coupled to the buffer output.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
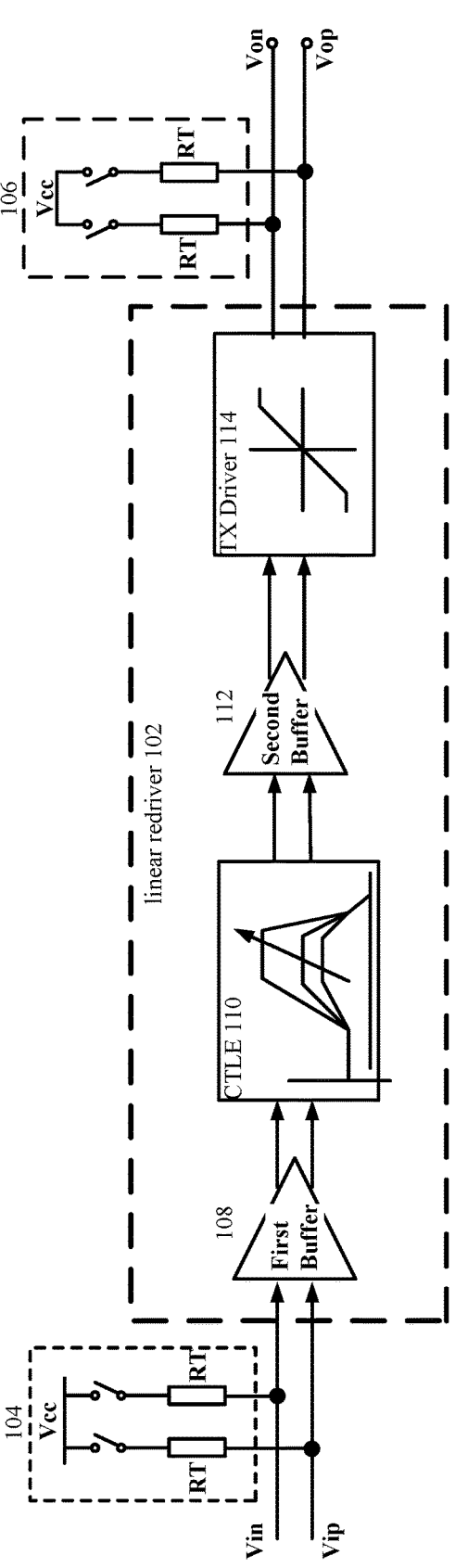
FIG. 1 represents an example communications circuit.
Figure 1:
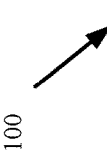

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Data communication systems often employ multiple channel stages (i.e. multi-stage) to buffer, level-shift, equalize, amplify and drive signals for various data channels. Such a multi-stage approach is particularly common in wide-band data communication systems.

For example, in linear re-driver applications, DC level-shifting and isolation of a CTLE (continuous time linear equalizer) from the re-driver's input pins is often needed, and DC level-shift and isolation from the CTLE to a transmit (TX) driver and/or gain stage after the CTLE is needed too.

While each of these stages have different power and packaging requirements, some stages consume more power than the others. For example, in some designs one or more signal buffers consume more power than either the equalizer, amplifier and drivers.

For example, active buffers (i.e. those with various amplifiers, transistors, etc.) are often chosen for level-shifting, bandwidth expansion, smaller circuit area, and additional gain, they also consume a considerable amount of current (e.g. active buffer can consume around 10-20 mA which is a considerable value for low power applications and often a good portion of a total consumed current). Even passive buffers designed for reduced power consumption use inductors which require a much larger circuit area and do not provide level-shifting.

Now discussed is a communications circuit designed for both low-power and minimal circuit area. The communications circuit in some example embodiments includes a passive buffer having a small circuit area and low power consumption.

Various example embodiments of the communications circuit include a resistive path for low-frequency part of signal with DC level-shifting and a capacitive path for high-frequency part of the signal.

DC programming/shifting is used in some example embodiments to set a required DC bias voltage of various stages in the communications circuit, such as a linear CTLE, a TX driver, or any other needed stage.

Example embodiments of the communications circuit to be discussed have at least the following benefits: providing passive boost for incoming wide-band high frequency signal to help CTLE peaking gain; isolating a CTLE from input pins of a receiver and from a PGA and/or TX driver; shifting output differential mode voltages to a different level from input differential mode voltages, and shifting a DC level of the input signal to any desired output signal level; programming of DC/peaking gain and output DC level; supporting a wide-band frequency range; supporting HDMI, PCIe5, PCIe6, USB3, DP, USB4, and other wired, and wireless communication protocols; compatibility with conventional CTLE, two dimensional CTLE, Bipolar, CMOS and BiCMOS architectures; adjusting for different DC level-shift and different capacitive loads; providing a feedback loop for shifting signals to meet the input and output requirement of the various communications circuit stages; and achieving a higher CTLE peaking gain.

FIG. 1 represents an example communications circuit 100. The example communications circuit 100 includes a linear redriver 102 configured to receive a set of differential mode input signals (Vip and Vin) and generate a set of differential mode output signals (Vop and Von). An input termination 104 is coupled to the set of differential mode input signals (Vip and Vin) and an output termination 106 is coupled to the set of differential mode output signals (Vop and Von).

The differential mode input signals (Vip and Vin) and/or the differential mode output signals (Vop and Von) may be either wired or wirelessly coupled to other circuits and devices. The termination 104, 106 (e.g. $R_T$=50Ω) may be terminated to a supply voltage (Vcc) or a reference potential (e.g. GND or any other desired voltage level) depending on a design strategy and employed technology.

The linear redriver 102 includes a first input buffer 108, a CTLE 110, a second input buffer 112, and a transmit (TX) driver 114.

In various example embodiments the first input buffer 108 provides at least one of the following between the set of differential mode input signals (Vip and Vin) and the CTLE 110 and/or the CLTL 110 and the TX driver 114: isolation, level-shifting, and/or amplification.

The input buffers 108, 112 may act as level-shifters between various stages to avoid loading of these stages and/or to have better PVT control in high-speed performance applications. Here the first input buffer 108 acts as an interface between the differential mode input signals (Vip and Vin) which must show for example a 40, 45 or 50Ω termination, depending on the application standard.

For example, the CTLE 110 and/or TX driver 114 may include bipolar transistors in BiCMOS or CMOS technology that form part of an input stage (i.e. input differential pair of BJTs or MOS s) and may need a certain DC level biasing. To make this happen, the first input buffer 108 before the CTLE 110 isolates the CTLE 110 from the differential mode input signals (Vip and Vin) and sets the CTLE's 110 DC level.

The CTLE 110 in various example embodiments has a $R_g/C_g$ degeneration impedance (which by programming $R_g$, provides a different CTLE 110 peaking gain. Other CTLE architectures can be used as well (e.g. such as a two dimensional CTLE).

If no gain stage is needed, the second input buffer 112 (probably including a level-shifter) between the CTLE 110 and the TX driver 114 isolates the CTLE 110 from any loading effects of the TX driver 114 and provides any needed differential mode DC value for the TX driver 114.

The TX driver 114 can be a CML TX driver 114, but any other TX driver 114 can be used as well. The TX driver 114 in some example embodiments is a differential pair that needs to drive a 50Ω termination (or 50Ω line), equally, with a few tens of milli-ampere depending on the required swing and linearity. This value can be different in different applications (i.e. different standards).

Often the differential pair transistors in the TX driver 114 are relatively large devices, and parasitic capacitors within the TX driver 114 and routing will load the CTLE 110 and impact its performance. Thus the second input buffer 112 functions as to isolate the CTLE 110 from the TX driver 114 and drive the long routing path from CTLE 110 to TX driver 114 and its relatively large input devices.

The second input buffer 112 also provides a right DC level for the TX driver 114 input if its value is different from DC level of CTLE 110 output. In this example embodiment the linear redriver 102 is using a 50Ω termination to the supply voltage (Vcc), so any needed circuit needs to work with a higher DC level. However, in case of termination to a reference potential (e.g. GND) then a lower DC level will be needed.

In some example embodiments, the communications circuit 100 includes a gain stage (e.g. programmable gain amplifier (PGA) or an automatic gain control (AGC) stage, not shown) after the CTLE 110 but before the second input buffer 112. The gain stage adjusts for overall communications circuit 100 gain variations due to manufacturing and operational PVT (process, voltage and temperature) variations.

Figure 2:
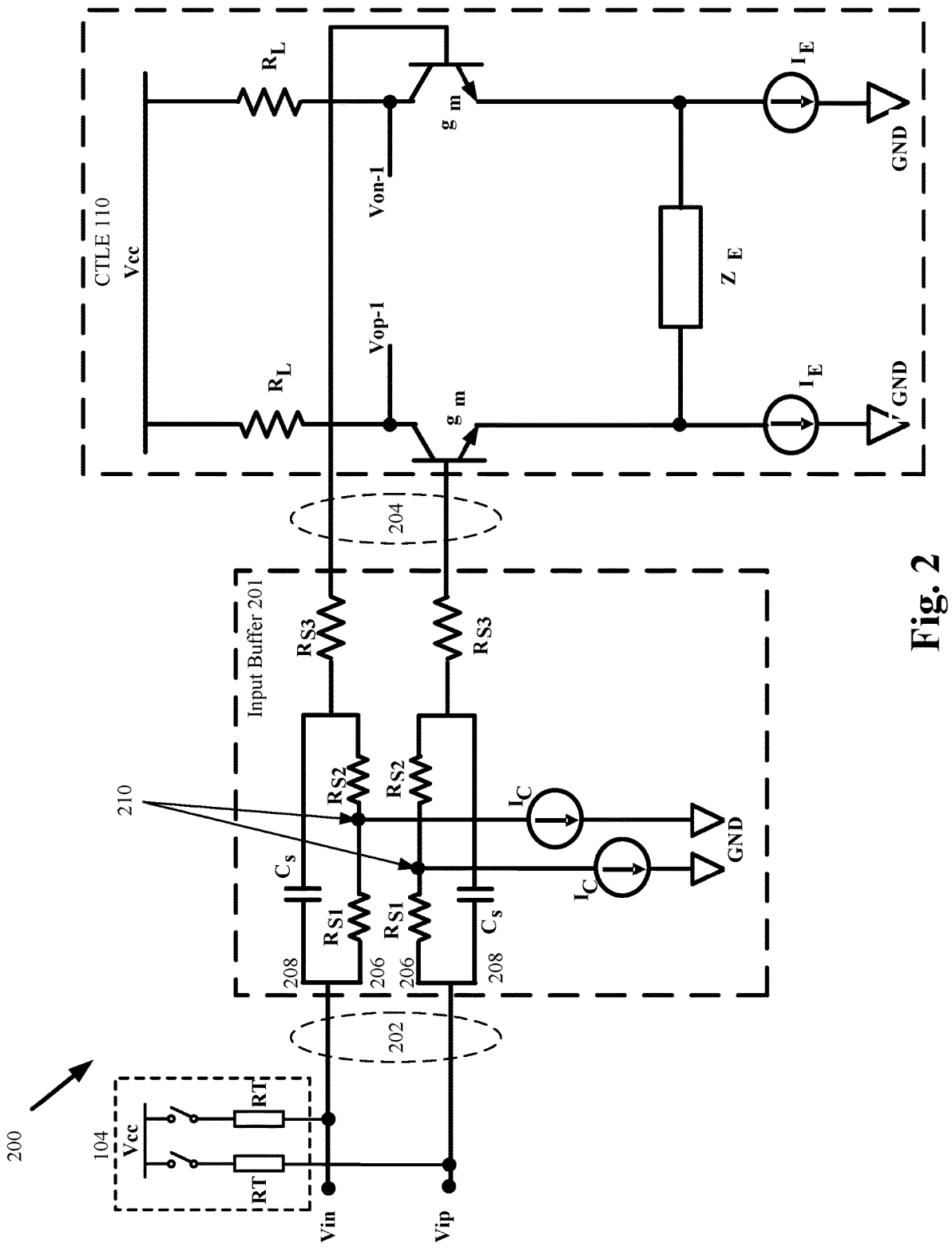
FIG. 2 represents a first example of an input buffer circuit within the communications circuit.

FIG. 2 represents a first example 200 of an input buffer circuit 201 within the communications circuit 100. The first example 200 shows the input buffer circuit 201 coupled to receive the differential mode input signals (Vip and Vin) and generate a set of differential mode output signals (204, after resistors $R_{S3}$) sent to the CTLE 110 which its outputs are Vop-1 and Von-1.

The input buffer circuit 201 includes a buffer input 202, a buffer output 204, a first path 206 and a second path 208. Supply voltage (Vcc) and reference potential (GND) connections are also as shown.

The first path 206 includes a first resistor ($R_{S1}$), a second resistor ($R_{S2}$), a current source (IC), and a mid-point 210. The second path 208 includes a capacitor (CS).

In the first path 206 the first resistor ($R_{S1}$) is coupled to the buffer input 202, and the second resistor ($R_{S2}$) is coupled to the buffer output 204 through third resistors $R_{S3}$. The first resistor ($R_{S1}$) and the second resistor ($R_{S2}$) are coupled to each other at the mid-point 210. The current source (IC) has a first end coupled to the mid-point 210 and a second end coupled to the reference potential (GND).

In the second path 208 a first end of a capacitor (CS) is coupled to the buffer input 202, and a second end of the capacitor (CS) is coupled to the buffer output 204 through third resistors $R_{S3}$.

The first resistor ($R_{S1}$)+the second resistor ($R_{S2}$) shape the first path 206 (i.e. low frequency path) while the capacitor (CS) shapes the second path 208 (i.e. high frequency path). In some example embodiments, instead of just capacitor (CS), CS+an inductor (LS) in series can be use if further bandwidth (BW) expansion is needed.

The first resistor ($R_{S1}$) also helps with the current source (IC) for DC level-shifting and the capacitor (CS) provides a right resonance frequency to make the input buffer circuit 201 a high BW buffer circuit. The second resistor ($R_{S2}$) isolates the current source (IC) from the CTLE's 110 input transistors (if $R_{S3}$ is not use, else $R_{S3}$ provides extra isolation).

A DC voltage at the differential mode output signals (Vop-1 and Von-1) sent to the CTLE 110 using this circuit is: $V_{dc}=V_{cc}-(R_T+R_{S1})*I_C$.

By making the current source (IC) programmable, in response to a control module (not shown) signal, the differential mode output signals (204) sent to the CTLE 110 can also be level-shifted to any desired values during real-time operation of the communications circuit 100.

Also as shown, there are two sets of first and second paths 206, 208, one set for each of the differential mode input signals (Vip and Vin). In such differential signal circuits with multiple current sources (CS), the current sources (CS s) should be well matched.

A separate resistor ($R_{S3}$) is coupled to both sets of paths and is included in some example embodiments as a safe-mode/ESD (electrostatic discharge) resistor for secondary ESD protection of the CTLE 110 (i.e. for USB3 standards compliance).

While the input buffer circuit 201 in this example embodiment is shown before the CTLE 110, in other example embodiments the input buffer circuit 201 can be located between the CTLE 110 and the TX driver 114, or anywhere else.

Figure 3:
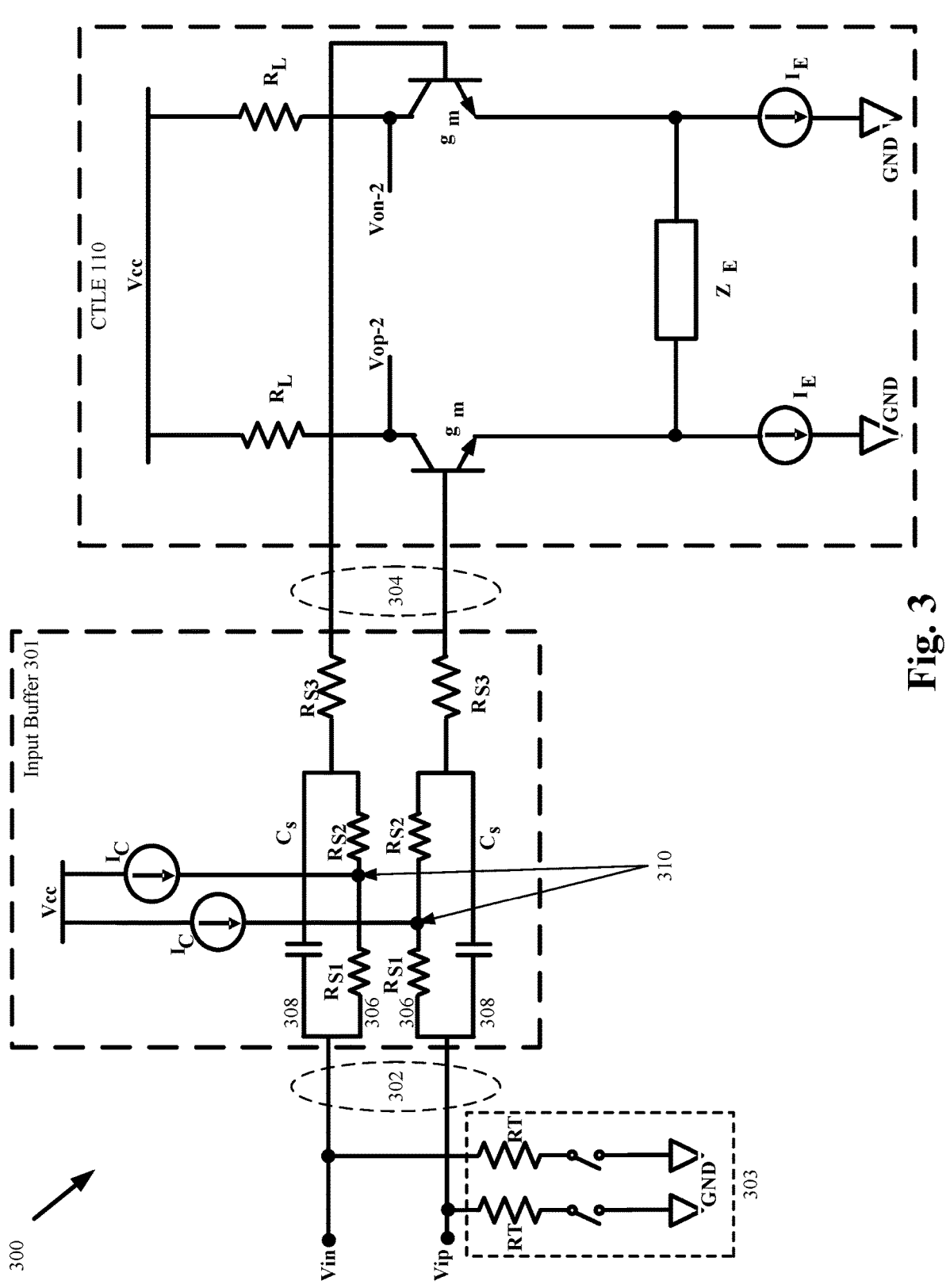
FIG. 3 represents a second example of the input buffer circuit within the communications circuit.

FIG. 3 represents a second example 300 of an input buffer circuit 301 within the communications circuit 100. The second example 300 shows the input buffer circuit 301 coupled to receive the differential mode input signals (Vip and Vin) and generate a set of differential mode output signals (304) sent to the CTLE 110. For this example embodiment, an input termination 303 is coupled between the set of differential mode input signals (Vip and Vin) and a reference potential (GND).

The input buffer circuit 301 includes a buffer input 302, a buffer output 304, a first path 306 and a second path 308. Supply voltage (Vcc) and the reference potential (GND) connections are also as shown.

The first path 306 includes a first resistor ($R_{S1}$), a second resistor ($R_{S2}$), a current source (IC), and a mid-point 310. The second path 308 includes a capacitor (CS).

In the first path 306 the first resistor ($R_{S1}$) is coupled to the buffer input 302, and the second resistor ($R_{S2}$) is coupled to the buffer output 304. The first resistor ($R_{S1}$) and the second resistor ($R_{S2}$) are coupled to each other at the mid-point 310.

The current source (IC) has a first end coupled to the mid-point 310 and a second end coupled to the supply voltage (Vcc).

In the second path 308 a first end of a capacitor (CS) is coupled to the buffer input 302, and a second end of the capacitor (CS) is coupled to the buffer output 304.

Thus the FIG. 2 terminated RT to Vcc solution works here as well for the terminated $R_T$ to ground. The current sources (CS) however will be in an opposite direction and inject DC current to the RTs, resulting in a DC level-shift up. Although $R_T$ is shown terminated to ground, it can in alternate example embodiments be terminated to any reference voltage, resulting in a DC level-shift to either a higher or lower voltage.

As before, the input buffer circuit 301 can be also used between CTLE 110 and TX driver 114 as pre-driver (if no gain is needed). Programming a DC voltage at input of TX driver 114 can be applied for linearity control compensation and gain adjustment in the repeater.

Since $R_T$ is in a range of 500 (e.g. 40$\Omega$ or 45$\Omega$), a main IR drop is happening through $R_{S1}*$IC. In some example embodiments, $R_{S1}$ is not too high so as not to reduce input signal level due to limited base impedance (base leakage) of input BJT devices or reduce the overall BW which is not preferred in many high-speed applications. Thus the current source (IC) needs to be relatively large (e.g. a few hundreds to a few milli amperes).

Figures 4, 5:
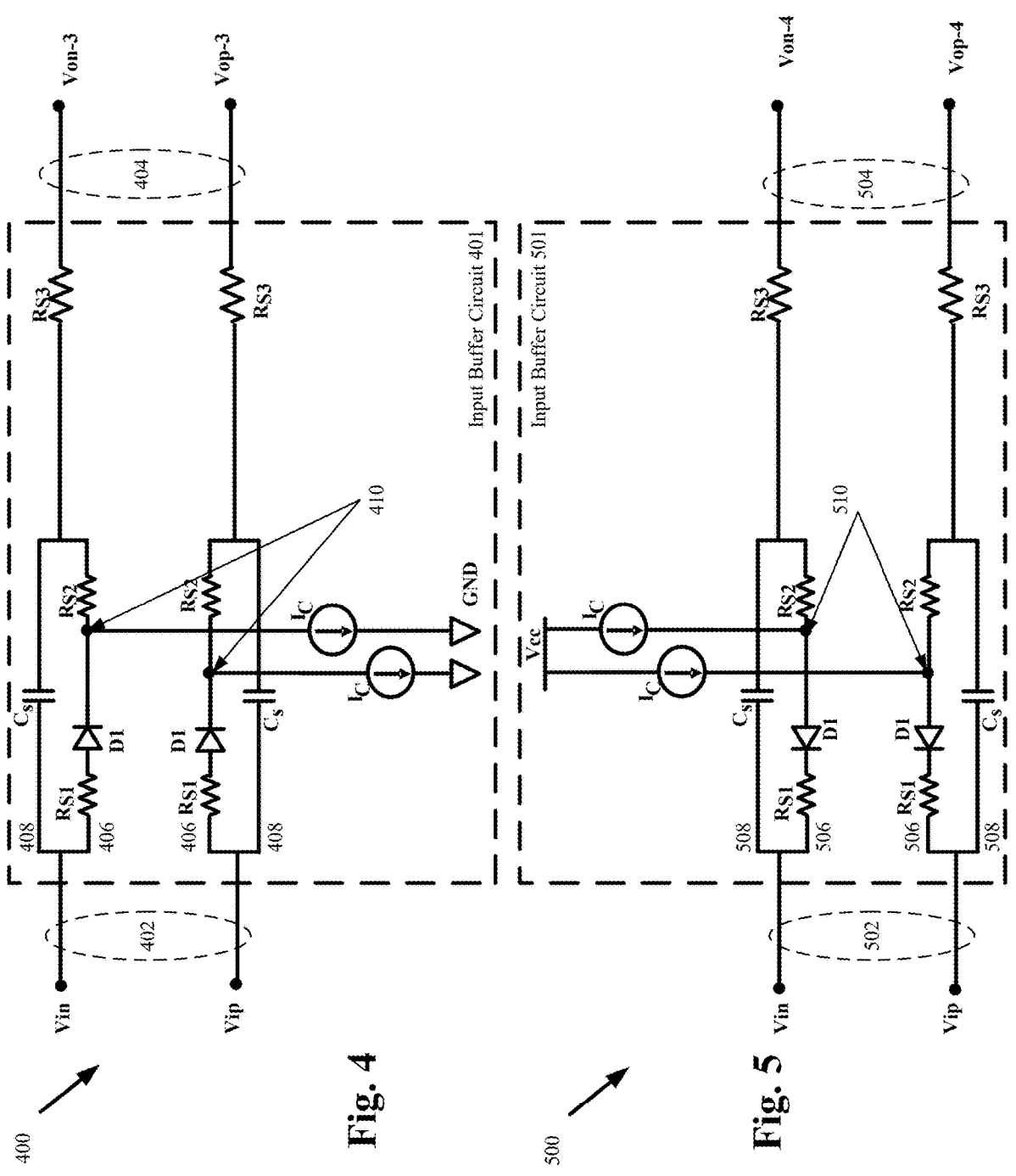
FIG. 4 represents a third example of the input buffer circuit within the communications circuit.
FIG. 5 represents a fourth example of the input buffer circuit within the communications circuit.

FIG. 4 represents a third example 400 of an input buffer circuit 401 within the communications circuit 100. The third example 400 shows the input buffer circuit 401 coupled to receive the differential mode input signals (Vip and Vin) and generate a set of differential mode output signals (Vop-3 and Von-3).

The input buffer circuit 401 includes a buffer input 402, a buffer output 404, a first path 406 and a second path 408. A reference potential (GND) connection is also as shown.

The first path 406 includes a first resistor ($R_{S1}$), a second resistor ($R_{S2}$), a current source (IC), a diode (D1), and a mid-point 410. The second path 408 includes a capacitor (CS).

In the first path 406 the first resistor ($R_{S1}$) is coupled to the buffer input 402 and the diode (D1). The second resistor ($R_{S2}$) is coupled to the buffer output 404. The diode (D1) and the second resistor ($R_{S2}$) are coupled to each other at the mid-point 410. The current source (IC) has a first end coupled to the mid-point 410 and a second end coupled to the reference potential (GND).

In the second path 408 a first end of a capacitor (CS) is coupled to the buffer input 402, and a second end of the capacitor (CS) is coupled to the buffer output 404.

Adding the diode (D1) in series with the first resistor ($R_{S1}$) helps to reduce a size of the first resistor ($R_{S1}$) and also further lowers the power consumption the input buffer circuit 401.

FIG. 5 represents a fourth example 500 of an input buffer circuit 501 within the communications circuit 100. The fourth example 500 shows the input buffer circuit 501 coupled to receive the differential mode input signals (Vip and Vin) and generate a set of differential mode output signals (Vop-4 and Von-4).

The input buffer circuit 501 includes a buffer input 502, a buffer output 504, a first path 506 and a second path 508. A supply voltage (Vcc) connection is also as shown.

The first path 506 includes a first resistor ($R_{S1}$), a second resistor ($R_{S2}$), a current source (IC), a diode (D1), and a mid-point 510. The second path 508 includes a capacitor (CS).

In the first path 506 the first resistor ($R_{S1}$) is coupled to the buffer input 502 and the diode (D1). The second resistor ($R_{S2}$) is coupled to the buffer output 504. The diode (D1) and the second resistor ($R_{S2}$) are coupled to each other at the mid-point 510. The current source (IC) has a first end coupled to the mid-point 510 and a second end coupled to the supply voltage (Vcc).

In the second path 508 a first end of a capacitor (CS) is coupled to the buffer input 502, and a second end of the capacitor (CS) is coupled to the buffer output 504.

Adding the diode (D1) in series with the first resistor ($R_{S1}$) helps to reduce a size of the first resistor ($R_{S1}$) and also further lowers the power consumption the input buffer circuit 501.

Figures 6, 7:
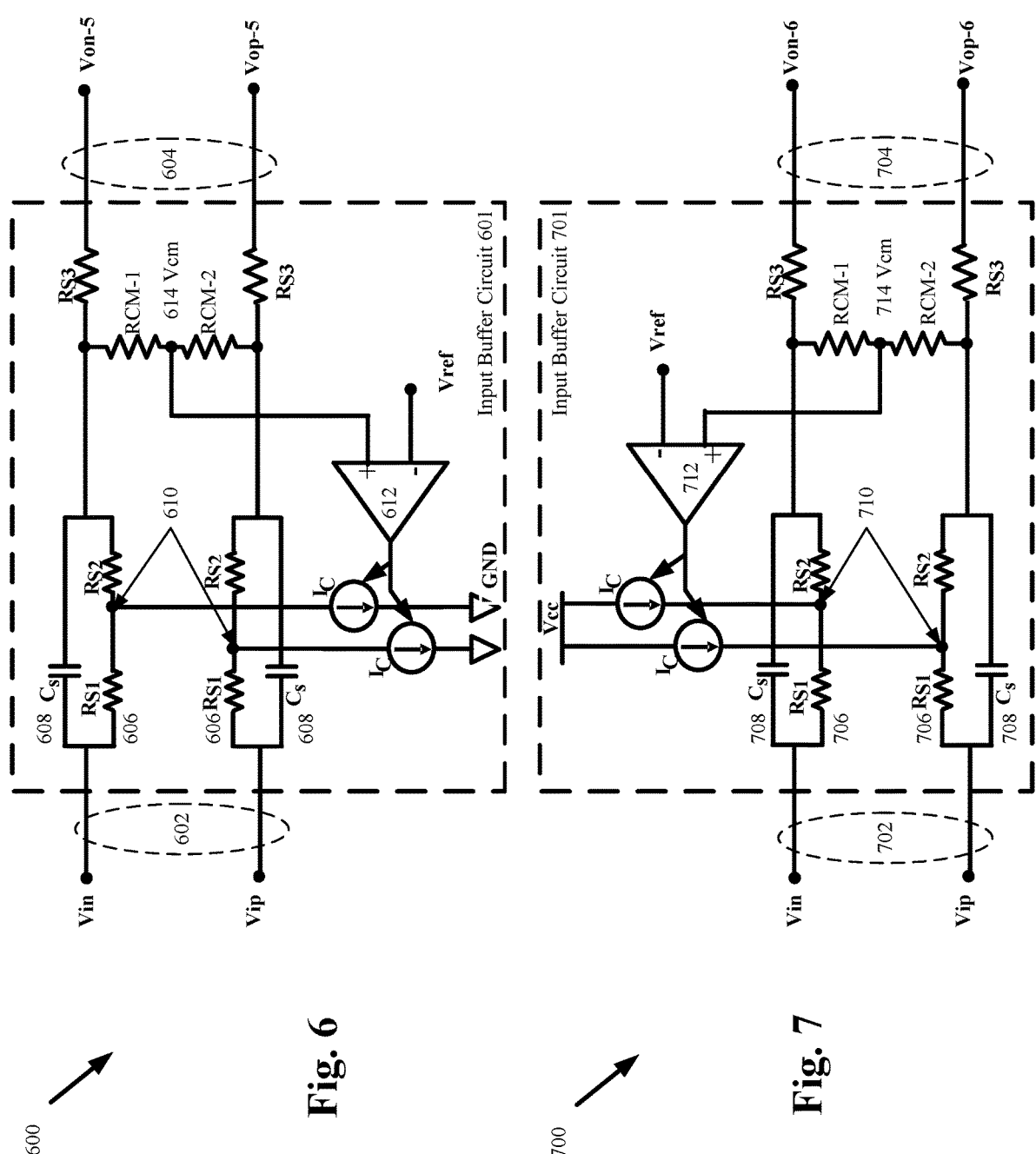
FIG. 6 represents a fifth example of the input buffer circuit within the communications circuit.
FIG. 7 represents a sixth example of the input buffer circuit within the communications circuit.

FIG. 6 represents a fifth example 600 of an input buffer circuit 601 within the communications circuit 100. The fifth example 600 shows the input buffer circuit 601 coupled to receive the differential mode input signals (Vip and Vin) and generate a set of differential mode output signals (Vop-5 and Von-5).

The input buffer circuit 601 includes a buffer input 602, a buffer output 604, a first path 606 and a second path 608. A reference potential (GND) connection is also as shown.

The first path 606 includes a first resistor ($R_{S1}$), a second resistor ($R_{S2}$), a current source (IC), and a mid-point 610. The second path 608 includes a capacitor (CS).

In the first path 606 the first resistor ($R_{S1}$) is coupled to the buffer input 602 and the second resistor ($R_{S2}$) is coupled to the buffer output 604. The first resistor ($R_{S1}$) and the second resistor ($R_{S2}$) are coupled to each other at the mid-point 610. The current source (IC) has a first end coupled to the mid-point 610 and a second end coupled to the reference potential (GND).

In the second path 608 a first end of a capacitor (CS) is coupled to the buffer input 602, and a second end of the capacitor (CS) is coupled to the buffer output 604.

The input buffer circuit 601 further includes a differential amplifier 612, a first common mode resistor (RCM-1), a second common mode resistor (RCM-2), and a mid-point 614 (Vcm). The first common mode resistor (RCM-1) is coupled between one of the differential mode output signals (Von-5) and the mid-point 614. The second common mode resistor (RCM-2) is coupled between one of the differential mode output signals (Vop-5) and the mid-point 614.

The differential amplifier 612 is coupled to receive a voltage reference (Vref) and a common mode voltage (Vcm) from the mid-point 614.

An output of the differential amplifier 612 is coupled to the current sources (ICs) and using this common-mode-feedback (CMF), keeps the differential mode output signals (Vop-6 and Von-6) more stable in response to any PVT (fabrication process, voltage, temperature) variations (keeps their common mode voltage equal to the well-defined Vref).

In an alternate embodiment, the voltage reference (Vref) can be replaced with another voltage for any other needed voltage tracking. Also the differential amplifier 612 can be replaced by a controller.

FIG. 7 represents a sixth example 700 of an input buffer circuit 701 within the communications circuit 100. The sixth example 700 shows the input buffer circuit 701 coupled to receive the differential mode input signals (Vip and Vin) and generate a set of differential mode output signals (Vop-6 and Von-6).

The input buffer circuit 701 includes a buffer input 702, a buffer output 704, a first path 706 and a second path 708. A supply voltage (Vcc) connection is also as shown.

The first path 706 includes a first resistor ($R_{S1}$), a second resistor ($R_{S2}$), a current source (IC), and a mid-point 710. The second path 708 includes a capacitor (CS).

In the first path 706 the first resistor ($R_{S1}$) is coupled to the buffer input 702 and the second resistor ($R_{S2}$) is coupled to the buffer output 704. The first resistor ($R_{S1}$) and the second resistor ($R_{S2}$) are coupled to each other at the mid-point 710. The current source (IC) has a first end coupled to the mid-point 710 and a second end coupled to the supply voltage (Vcc).

In the second path 708 a first end of a capacitor (CS) is coupled to the buffer input 702, and a second end of the capacitor (CS) is coupled to the buffer output 704.

The input buffer circuit 701 further includes a differential amplifier 712, a first common mode resistor (RCM-1), a second common mode resistor (RCM-2), and a mid-point 714 (Vcm). The first common mode resistor (RCM-1) is coupled between one of the differential mode output signals (Von-6) and the mid-point 714. The second common mode resistor (RCM-2) is coupled between one of the differential mode output signals (Vop-6) and the mid-point 714.

The differential amplifier 712 is coupled to receive a voltage reference (Vref) and a common mode voltage (Vcm) from the mid-point 714.

An output of the differential amplifier 712 is coupled to the current sources (ICs) and using this common-mode-feedback (CMF), keeps the differential mode output signals (Vop-6 and Von-6) more stable in response to any PVT (fabrication process, voltage, temperature) variations (keeps their common mode voltage equal to the well-defined Vref).

In an alternate embodiment, the voltage reference (Vref) can be replaced with another voltage for any other needed voltage tracking. Also the differential amplifier 712 can be replaced by a controller.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A communications circuit, comprising:
a buffer having a buffer input and a buffer output;
wherein the buffer includes a first path and a second path;
wherein the first path includes,
    a first resistor coupled to the buffer input;
    a second resistor coupled to the buffer output;
    a current source having a first end and a second end;
wherein the first resistor and the second resistor are coupled to a mid-point;
wherein the first end of the current source is coupled to the mid-point;
wherein the second path includes a capacitor having a first end coupled to the buffer input and a second end coupled to the buffer output;
wherein the buffer input is a differential input having a first input line and a second input line; and
wherein the first path and the second path together form a first path set coupled to the first input line;
further comprising a second path set coupled to the second input line;
wherein the second path set is a duplicate of the first path set.

2. The circuit of claim 1:
wherein the second end of the current source is coupled to a reference potential.

3. The circuit of claim 2:
wherein the reference potential is a ground potential.

4. The circuit of claim 1:
wherein the second end of the current source is coupled to a power source.

5. The circuit of claim 1:
wherein the buffer is at least one of an isolator, a level-shifter, or an amplifier between the buffer input and the buffer output.

6. The circuit of claim 1:
wherein the buffer includes a diode coupled between the first resistor and the mid-point.

7. The circuit of claim 1:
wherein the communications circuit is a linear redriver circuit.

8. The circuit of claim 1:
wherein the buffer includes a feedback circuit coupled to modulate the current source's current based on a voltage at the buffer output.

9. The circuit of claim 1:
wherein the buffer includes a controller coupled to the current source; and wherein the controller is configured to adjust the current source's current based on a voltage from the buffer output.

10. The circuit of claim 1, further comprising:
a CTLE (continuous time linear equalizer) coupled to the buffer output.

11. The circuit of claim 1, further comprising:
a transmit (TX) driver coupled to the buffer output.

12. The circuit of claim 1:
wherein the buffer output is a differential output having a first output line and a second output line;
wherein the first path set is coupled to the first output line; and
wherein the second path set is coupled to the second output line.

13. The circuit of claim 12:
wherein the buffer includes a differential amplifier coupled to receive a voltage reference and a common mode voltage divided from the first and second output lines.

14. The circuit of claim 13:
wherein the differential amplifier is coupled to control the current sources in the first path set and the second path set.

15. The circuit of claim 1:
wherein the first end of the capacitor is directly coupled to the first resistor; and
wherein the second end of the capacitor is directly coupled to the second resistor.

16. A communications circuit, comprising:
a buffer having a buffer input and a buffer output;
wherein the buffer includes a first path and a second path;
wherein the first path includes,
    a first resistor coupled to the buffer input;
    a second resistor coupled to the buffer output;
    a current source having a first end and a second end;
    wherein the first resistor and the second resistor are coupled to a mid-point;
    wherein the first end of the current source is coupled to the mid-point;
    wherein the second path includes a capacitor having a first end coupled to the buffer input and a second end coupled to the buffer output;
    wherein the buffer is a first buffer, the buffer input is a first buffer input, and the buffer output is a first buffer output; and
    wherein the communications circuit further comprises,
        a second buffer, that is a duplicate of the first buffer and is coupled to a second buffer input and a second buffer output;
        a CTLE (continuous time linear equalizer) coupled between the first buffer output and the second buffer input; and
        a transmit (TX) driver coupled to the second buffer output.

17. The circuit of claim 16, further comprising;
an input termination circuit coupled to the first buffer input; and
an output termination circuit coupled to an output of the TX driver.

* * * * *